United States Patent [19]
Miller

[11] 4,085,815
[45] Apr. 25, 1978

[54] VEHICLE COMPONENT ASSEMBLY

[75] Inventor: Lindell L. Miller, Plano, Ill.

[73] Assignee: Caterpillar Tractor Co., Peoria, Ill.

[21] Appl. No.: 674,783

[22] Filed: Apr. 8, 1976

[51] Int. Cl.² .................. B60R 27/00; B62D 25/00
[52] U.S. Cl. ..................... 180/54 R; 123/198 E; 180/1 R; 180/89.1
[58] Field of Search .............. 180/54 R, 64 R, 1 R, 180/89.1, 69 R, 69 C, 90, 54 A; 123/198 E, 198 R

[56] References Cited
U.S. PATENT DOCUMENTS

| | | | |
|---|---|---|---|
| 2,084,572 | 6/1937 | Breer | 180/69 C X |
| 2,538,489 | 1/1951 | Walton | 180/90 |
| 3,583,513 | 6/1971 | Macadam et al. | 180/69 R |
| 3,882,951 | 5/1975 | Conley | 180/54 A X |

Primary Examiner—Joseph F. Peters, Jr.
Assistant Examiner—Milton L. Smith
Attorney, Agent, or Firm—Wegner, Stellman, McCord, Wiles & Wood

[57] ABSTRACT

A vehicle component assembly wherein a plurality of auxiliary structures associated with the engine and transmission of a vehicle are disposed in a preselected space. A number of the auxiliary structures may be mounted to a common support for facilitated preliminary testing and installation in the vehicle. An enclosure may be provided for enclosing the space in which the structures are disposed and may include selectively positionable closure structure for providing selective access to the auxiliary structures in the space.

3 Claims, 3 Drawing Figures

VEHICLE COMPONENT ASSEMBLY

BACKGROUND OF THE INVENTION

1. Field of the Invention

This invention relates to vehicles and in particular to a component assembly for use in vehicles.

2. Description of the Prior Art

In a conventional vehicle, an engine is provided for driving the wheels, etc. through a transmission. A lubricating system is conventionally provided which may include auxiliary structural components of the engine, such as lubricant filters, a filler tube having an inlet for delivering lubricant to the lubricating system, and an engine oil quick-fill duct having an inlet for quickly delivering lubricant to the engine. A dipstick may be provided with a manipulating portion for selectively determining the level of lubricant in the system.

It is further conventional in such engines to provide air filter means for cleaning the air prior to delivery thereof to the engine for combustion of the fuel therein. Similarly, a fuel filter may be provided for filtering the fuel prior to delivery thereof to the engine.

It is further conventional to provide a filter for the transmission oil and a filter for the pilot hydraulic system oil.

In the conventional engine, the different auxiliary components are mounted at various positions and conventionally by suitable securing means to different portions of the engine or other vehicle structure.

It is further conventional to test such components prior to the installation thereof in the vehicle.

In certain vehicle arrangements, the auxiliary components may be adjacently disposed as a result of the individually determined mounting positions for the different components.

SUMMARY OF THE INVENTION

The present invention comprehends an improved vehicle arrangement wherein a component assembly is provided within a preselected space. The space may be defined by enclosure means having a selectively disposable closure for selective access to the space and auxiliary components therein, as desired.

A number of the auxiliary components may be mounted to a common support, such as a bracket, permitting the facilitated preassembly thereof, bench testing of the components, and facilitated installation in the vehicle within the preselected space.

The components disposed in the space may include components of the lubricating system of both the engine and transmission, the air filter, and the fuel filter. Similarly, the transmission oil filter may be provided in the space. Further, the pilot hydraulic system oil filter may be provided in the space.

Thus, the present invention comprehends providing an improved vehicle component assembly wherein a major portion of the engine and transmission auxiliary components are disposed within a preselected space for facilitated access and servicing of the vehicle.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
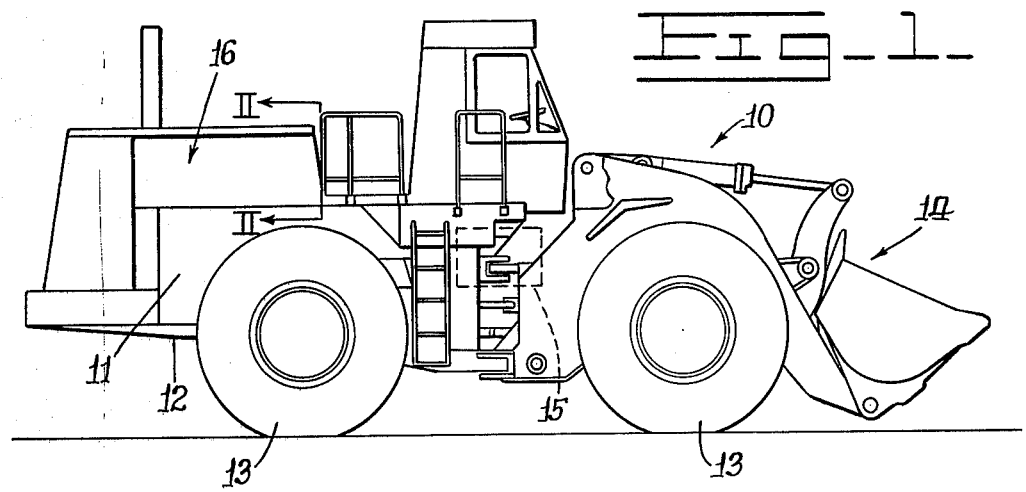
FIG. 1 is a side elevation of a vehicle having a component assembly embodying the invention.

In the exemplary embodiment of the invention as disclosed in the drawing, a vehicle generally designated 10 is illustrated as a loader vehicle having an engine generally designated 11 carried on a frame generally designated 12 movably supported on a plurality of wheels 13. The vehicle may be provided with earthmoving and handling structure, such as a bulldozer blade 14. The illustrative vehicle is exemplary only, it being understood that the invention is adapted for use with a wide range of vehicles.

The vehicle may be further provided with a transmission 15 for selectively controlling the driving of the vehicle. The present invention is concerned with the provision of an improved auxiliary component assembly for use with the engine and transmission means of the vehicle, providing improved accessibility and facility of servicing. More specifically, an enclosure portion generally designated 16 of the vehicle is arranged to define a preselected space generally designated 17 in which the component assembly is disposed.

Figure 3:
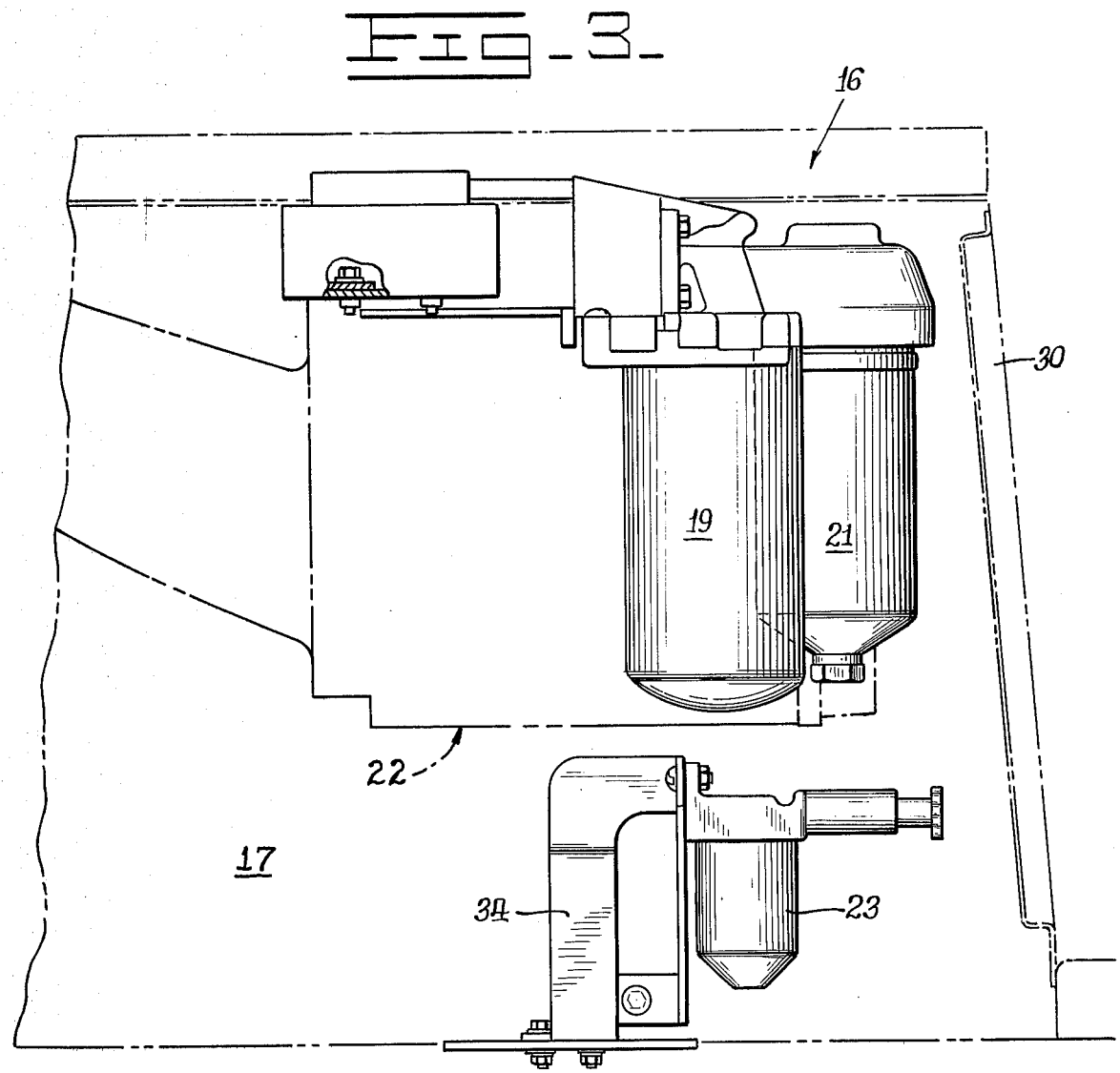
FIG. 3 is a fragmentary vertical elevation taken substantially along the line 3—3 of FIG. 2.
Figure 2:
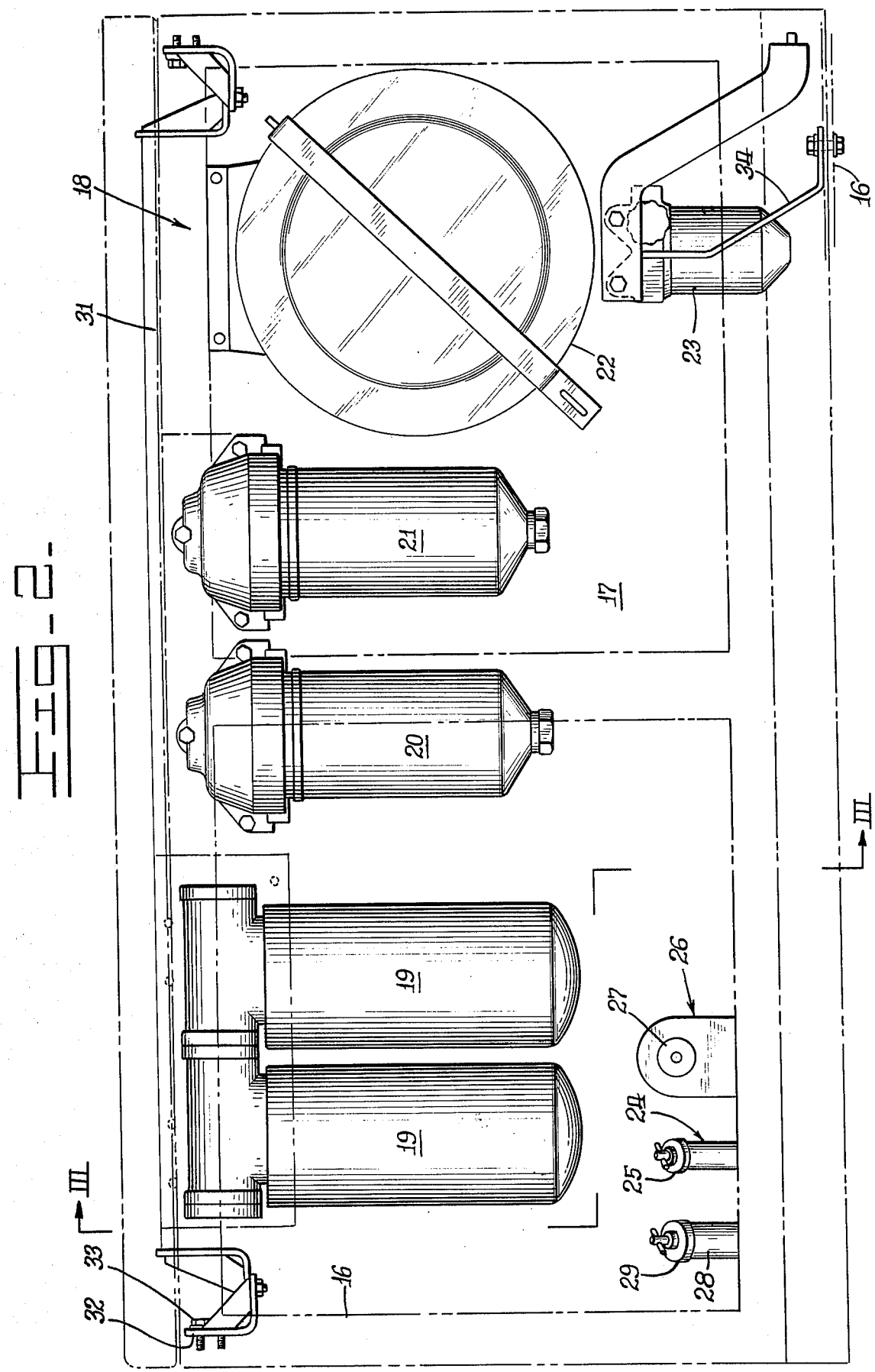
FIG. 2 is an enlarged vertical section taken substantially along the line 2—2 of FIG. 1.

Referring now more specifically to FIGS. 2 and 3, the vehicle component assembly generally designated 18 may include a plurality of auxiliary component structures as conventionally utilized in such vehicles. Such structures include one or more engine oil filters 19, a pilot hydraulic system oil filter 20, a transmission oil filter 21, an engine air filter 22, and a fuel filter 23.

Additionally, the lubricating system of such engines may be provided with an oil fill duct 24 having an inlet 25 through which oil may be added to the lubricating system. A quick-fill duct 26 may be provided having an inlet 27 through which lubricating oil may be quickly delivered to the engine. Additionally, a dipstick device 28 may be provided having a manipulating portion 29 for selectively determining the level of lubricant in the lubricating system.

The enclosure portion 16, as shown in FIG. 3, may be provided with a selectively removable door 30 for providing controlled access to the preselected component space 17.

The present invention comprehends a novel arrangement of the vehicle structure wherein a majority of the auxiliary component structures are assembled in the preselected space 17 to permit facilitated servicing by means of the improved accessibility provided by the localized assembly and facilitated access through the enclosure portion 16 upon removal of the closure door 30. More specifically, as shown in FIG. 2, a plurality of the auxiliary components may be mounted to a common bracket 31 and, thus, supported within the space 17 as a unit. Bracket 31 may be provided with suitable mounting portions 32 adapted to be secured to the enclosure portion 16 by suitable removable securing means, such as bolts 33.

In the illustrated embodiment, the engine oil filters 19, pilot hydraulic system oil filter 20, transmission oil filter 21, and air filter 22 may be mounted to the support bracket 31 to define a subassembly unit which may be readily tested as by bench testing prior to the installation thereof in the vehicle space 17. The lubricating system components, such as filler duct inlet 25, quick-fill duct inlet 27, and dipstick handle 29 may be similarly disposed in a lower portion of space 17, as shown in FIG. 2.

The fuel filter 23 may be carried on a separate bracket 34 mounted to the enclosure portion 16, as shown in FIG. 2, so as to be disposed also within the space 17.

The invention comprehends disposing a majority of the above discussed component structures within space 17. Such disposition facilitates servicing and replacement of the components when desired. The mounting of a substantial number of the components on a common support further facilitates the original testing and installation thereof, permitting improved low cost manufacture of the vehicle while further providing for facilitated servicing, as discussed above.

By locating the means for introduction of lubricating oil to the system and for manually determining the level of lubricating oil in the system also in the preselected space 17, further improved servicing of the vehicle as a result of the further cenralization of the vehicle components is effected.

The foregoing disclosure of specific embodiments is illustrative of the broad inventive concepts comprehended by the invention.

I claim:

1. In a vehicle having a frame, wheels carrying said frame, an engine carried by said frame between a pair of said wheels, a transmission, an engine lubricating system, a plurality of auxiliary structures including an engine lubricant filter, a pilot control system filter, a filler tube having an inlet for delivering lubricant to the lubricating system, and a dipstick having a manipulating portion for indicating the quantity of lubricant in the lubricating system, an air filter for cleaning air to be delivered to the engine, and an engine fuel filter, the improvement comprising: enclosure means above said engine and defining a service space having a side opening, said side opening being disposed to open horizontally to above one of said wheels; means for disposing a majority of the engine lubricant filter, transmission oil filter, pilot control system filter, engine lubricant filler tube inlet, engine lubricant dipstick manipulating portion, engine air filter, and engine fuel filter auxiliary structures in said service space for facilitated servicing of the auxiliary structures therein from adjacent said one wheel; and selectively positionable closure means for providing selective access to substantially only said service space.

2. The vehicle structure of claim 1 wherein a unitary support is provided carrying each of said engine lubricant filter, said air cleaner, and said pilot control system filter.

3. The vehicle structure of claim 1 wherein said plurality of structures further includes an engine lubricant quick-fill duct having an inlet in said service space.

* * * * *